(12) United States Patent
Byl

(10) Patent No.: US 12,196,368 B2
(45) Date of Patent: Jan. 14, 2025

(54) STORAGE AND DELIVERY VESEEL FOR STORING GeH4, USING A ZEOLITIC ADSORBENT

(71) Applicant: Entegris, Inc., Billerica, MA (US)

(72) Inventor: Oleg Byl, Southbury, CT (US)

(73) Assignee: ENTEGRIS, INC., Billerica, MA (US)

( * ) Notice: Subject to any disclaimer, the term of this patent is extended or adjusted under 35 U.S.C. 154(b) by 684 days.

(21) Appl. No.: 17/495,363

(22) Filed: Oct. 6, 2021

(65) Prior Publication Data

US 2022/0112986 A1  Apr. 14, 2022

Related U.S. Application Data

(60) Provisional application No. 63/089,441, filed on Oct. 8, 2020.

(51) Int. Cl.
  *F17C 11/00*   (2006.01)
  *B01J 20/22*   (2006.01)
  *B01J 20/28*   (2006.01)

(52) U.S. Cl.
  CPC ............ *F17C 11/00* (2013.01); *B01J 20/226* (2013.01); *B01J 20/28019* (2013.01); *B01J 2220/66* (2013.01); *F17C 2201/0119* (2013.01); *F17C 2205/0323* (2013.01); *F17C 2221/01* (2013.01); *F17C 2223/031* (2013.01); *F17C 2270/0518* (2013.01)

(58) Field of Classification Search
  CPC .. B01D 53/02; B01D 2259/4525; B01J 20/20; B01J 20/3078; F17C 11/00; F17C 2205/0323; F17C 2265/01; F17C 2270/0518
  USPC ...................................... 96/108; 95/900–903
  See application file for complete search history.

(56) References Cited

U.S. PATENT DOCUMENTS

| | | |
|---|---|---|
| 2003/0148165 A1 | 8/2003 | Muller |
| 2004/0118286 A1 | 6/2004 | Brestovansky |
| 2015/0352519 A1 | 12/2015 | Kim |
| 2020/0088352 A1* | 3/2020 | Despres ................. F17C 11/00 |
| 2020/0206717 A1 | 7/2020 | Dubois |
| 2022/0112986 A1* | 4/2022 | Byl ......................... F17C 11/00 |
| 2022/0234105 A1* | 7/2022 | Sturm .................... B01J 20/226 |

FOREIGN PATENT DOCUMENTS

| | | | |
|---|---|---|---|
| KR | 20190140483 A | 12/2019 | |
| WO | 2018175371 A1 | 9/2018 | |
| WO | WO 2022087045 A1 * | 4/2022 | ............ B01D 53/02 |

\* cited by examiner

*Primary Examiner* — Minh Chau T Pham

(57) ABSTRACT

Described are storage and dispensing systems and related methods, for the selective dispensing germane ($GeH_4$) as a reagent gas from a vessel in which the germane is held in sorptive relationship to a solid adsorbent medium that includes a zeolitic imidazolate framework.

17 Claims, 3 Drawing Sheets

US 12,196,368 B2

STORAGE AND DELIVERY VESEEL FOR STORING GeH4, USING A ZEOLITIC ADSORBENT

FIELD

The invention relates generally to storage and dispensing systems, and related methods, for the selective dispensing of germane (GeH$_4$) as a reagent gas from a vessel in which the germane is held in sorptive relationship to a solid adsorbent medium that includes a zeolitic imidazolate framework.

BACKGROUND

Gaseous raw materials (referred to sometimes as "reagent gases") are used in a range of industries and industrial applications. Some examples of industrial applications include those used in processing semiconductor materials or microelectronic devices, such as ion implantation, expitaxial growth, plasma etching, reactive ion etching, metallization, physical vapor deposition, chemical vapor deposition, atomic layer deposition, plasma deposition, photolithography, cleaning, and doping, among others, with these uses being included in methods for manufacturing semiconductor, microelectronic, photovoltaic, and flat-panel display devices and products, among others.

In the manufacture of semiconductor materials and devices and various other industrial processes and applications, there is ongoing need for reliable sources of highly pure reagent gases. Examples include silane, germane (GeH$_4$), ammonia, phosphine, arsine, diborane, stibine, hydrogen sulfide, hydrogen selenide, hydrogen telluride, and corresponding and other halide (chlorine, bromine, iodine, and fluorine) compounds. Many of these gases must be stored, transported, handled, and used with a high level of care and with many safety precautions, such as a storage vessel that contains a reagent gas at sub-atmospheric pressure.

A variety of different types of containers are used to contain, store, transport, and dispense reagent gases for industrial use. Some containers, referred to herein as "adsorbent-based containers," contain a gas using a porous adsorbent material included within the container, wherein the reagent gas is stored by being adsorbed onto the adsorbent material. The adsorbed reagent gas may be contained in the vessel in equilibrium with the reagent gas also present in condensed or gaseous form in the container.

The gaseous raw material must be delivered for use in a concentrated or substantially pure form, and must be available in a packaged form that provides a reliable supply of the gas for efficient use of the gas in a manufacturing system.

In addition to a high purity, another desired feature of a stored gas product is a high amount of deliverable gas that can be dispensed from a storage vessel product. A higher amount of deliverable material in a vessel (a higher "deliverable gas capacity") improves the efficiency of using the stored gas product and its contained gaseous raw material in a manufacture process, because the vessel may be used for a longer period of time (relative to a vessel with a lower amount of deliverable material) without replacement. Operating efficiency is increased if the frequency of replacing a spent (e.g., empty) vessel with a new vessel is reduced. Additionally, a reduced amount of the expensive gaseous raw material is left unused, i.e., wasted, within the storage vessel.

SUMMARY

Germane (GeH$_4$) is used in semiconductor processing industries for various purposes, for example as a germane source gas for the epitaxial growth of germanium. When used for semiconductor processing, germane must be provided at very high purity. In commercial product forms, germane gas has been made available as germane gas adsorbed on a solid adsorbent and stored in a cylinder from which the germane gas can be dispensed at a high level of purity.

Purity of germane delivered from present and past adsorbent-based storage systems is sufficient for many commercial uses. Still, there remains an ongoing need for increasingly higher levels of purity of germane used for semiconductor processing. Germane is known to decompose during storage to produce hydrogen gas (H$_2$), including when stored within an adsorbent-based storage system. Desirable or preferred germane storage systems would be ones that store germane at a condition that does not cause or allow undue degradation of the germane, e.g., systems that store the germane at a condition that allows for only a low amount of decomposition of the germane during storage. Thus, a desired feature of an adsorbent-based system for storing germane is a reduced or minimized amount of decomposition of the germane that occurs during storage, and an attendant reduced or minimized amount of hydrogen contained in gaseous germane delivered from the storage system.

Examples of useful or preferred systems of storing germane in a storage vessel that contains zeolitic imidazolate framework adsorbent can exhibit a useful or relatively low amount of germane degradation during storage of the stored germane. For example, germane stored in a storage vessel as described may experience less than 1 percent degradation, or preferably less than 0.1% decomposition, or more preferably less than 0.01% decomposition, of total amount of initial adsorbed germane, after 365 days of storage at ambient temperature (e.g., 32C).

Also desirably, an adsorbent-based system for storing germane can be one that exhibits a useful storage capacity with a useful or advantageously high deliverable gas capacity. A storage vessel as described, containing zeolitic imidazolate framework as an adsorbent to contain adsorbed germane, at sub-atmospheric pressure, can exhibit a useful storage capacity in combination with a useful or advantageous deliverable capacity.

A "storage capacity" or "total storage capacity" of a storage vessel that contains adsorbent and adsorbed reagent gas, e.g., germane, refers to the amount of the reagent gas that can be contained in the vessel, per the volume of the vessel; an alternate measure of storage capacity is total weight reagent gas (e.g., grams) per weight adsorbent (e.g., grams). Storage capacity is measured as the amount of gas that can be contained in a vessel that contains the adsorbent, per total volume of the vessel. Zeolitic imidazolate framework adsorbents used to store a reagent gas such as germane at sub-atmospheric pressure may inherently have a lower storage capacity compared to other types of adsorbents, such as carbon-type adsorbents.

A different measure of performance of adsorbent-type storage systems is the "deliverable capacity" of a vessel that contains reagent gas stored in the vessel with adsorbent. "Deliverable capacity" refers to an amount of stored reagent gas that is contained in the vessel and that can be delivered from the vessel in a useful form, compared to the amount of total reagent gas contained in the vessel. Deliverable capacity may be described as an amount (percentage) of a stored gas that can be delivered (discharged) from a storage vessel, compared to the total amount of the stored gas that is stored within the vessel. Desirably, a deliverable capacity of gas contained in a commercial storage vessel can be at least 50 or 70 percent of the total amount of gas contained in the vessel.

According to example storage systems of the present description, a storage vessel that contains zeolitic imidazolate framework adsorbent and adsorbed germane, at sub-atmospheric pressure, can deliver at least 80, 90, 95, or 99 percent of the total amount of germane stored in the vessel, i.e., the storage vessel has a deliverable capacity of at least 80, 90, 95, or 99 percent of the total amount of gas in the vessel. The vessel may be capable of delivering germane gas from the vessel at a discharge pressure of below 50, 30, 20, 15, 10, 5, 3, 1, or 0.5 Torr. This high level of deliverable capacity of stored germane gas is useful or potentially advantageous as compared to a deliverable capacity of other types of adsorbent materials such as carbon-based adsorbents, which often have a "heel" (gas that is unable to be extracted at discharge pressures as low as 5 Torr) exceeding 10 percent (molar) of the total adsorbed gas in a given system.

In one aspect, the invention relates to a storage and dispensing vessel enclosing an interior volume that contains zeolitic imidazolate framework adsorbent and $GeH_4$ adsorbed on the adsorbent. The vessel includes: a port; a valve mounted at the port; zeolitic imidazolate framework adsorbent within the interior volume; and $GeH_4$ adsorbed on the zeolitic imidazolate framework. The vessel is selectively actuatable to flow gaseous $GeH_4$ from the interior volume of the vessel, through the valve, for discharge of the $GeH_4$ from the vessel.

DETAILED DESCRIPTION

Figure 1:
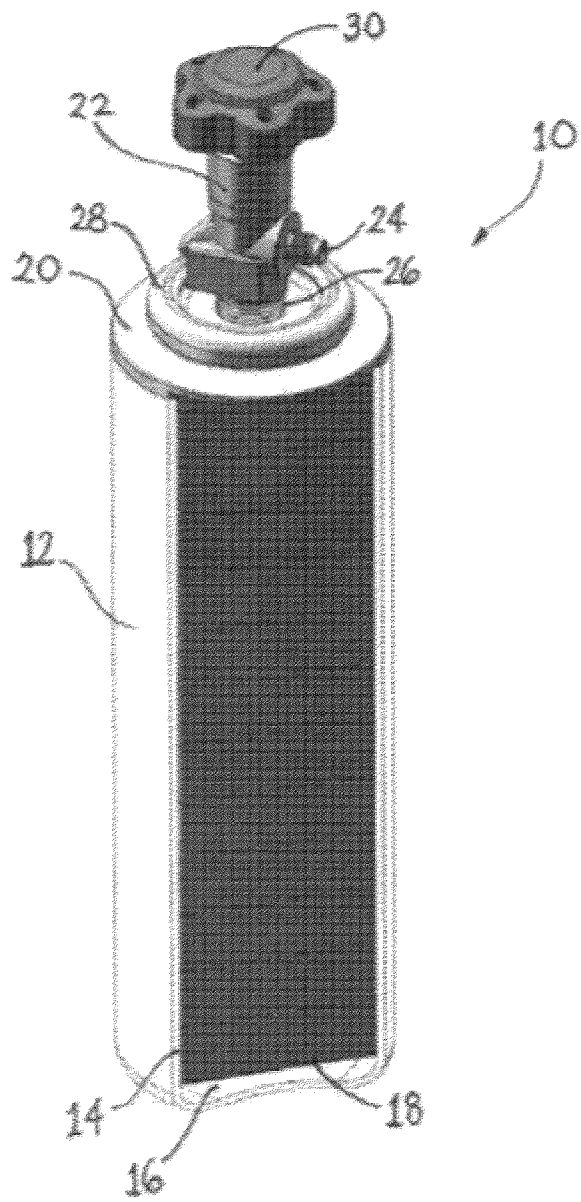
FIG. 1 shows an example storage system of the present description.

The present description relates to novel and inventive systems that involve storing germane in a vessel that contains zeolitic imidazolate framework adsorbent, with germane adsorbed to the adsorbent, and to novel and inventive methods of using the storage systems to store, handle, and deliver germane.

A storage system as describes includes a vessel that contains zeolitic imidazolate framework (ZIF) adsorbent material at its interior. The adsorbent material is effective to contain, store, and deliver germane from the storage vessel. Germane is adsorbed on the zeolitic imidazolate framework adsorbent and is present as a gas at the vessel interior, with a portion of the germane being adsorbed by the zeolitic imidazolate framework, and another portion being in gaseous form or condensed and gaseous form and in equilibrium with the adsorbed portion.

The pressure at the interior of the vessel may be sub-atmospheric, meaning below about 760 Torr (absolute). During storage of the vessel, or during use of the vessel to dispense germane, the pressure at the interior of the vessel may be below 760 Torr, e.g., below 700, 600, 400, 200, 100, 50, or 20 Torr.

The following description relates to the use of a zeolitic imidazolate framework ("ZIF") in an adsorbent-based storage vessel to store germane ($GeH_4$) at sub-atmospheric pressure. The Applicant has determined that the use of a zeolitic imidazolate framework as an adsorbent can allow for useful or preferred storage capabilities of germane.

Examples of preferred storage systems as described, for storage of germane adsorbed by zeolitic imidazolate framework adsorbent, can exhibit a useful storage capacity for germane, e.g., a storage capacity of at least 100 g/kg, or preferably 200 g/kg, or more preferably greater than 300 g/kg.

The example storage systems can also exhibit a useful or advantageous deliverable capacity of germane, e.g., a deliverable capacity of at least 80, 90, 95, or 99 percent, meaning that the storage vessel can dispense at least 80, 90, 95, or 99 percent of a total amount of germane stored at the vessel interior. Example storage systems may dispense germane at a pressure as low as 50, 20, 10, 5, 3, 1, or 0.5 Torr.

Examples of useful or preferred systems of germane stored in a storage vessel that contains zeolitic imidazolate framework adsorbent can exhibit a useful or relatively low amount of germane decomposition during storage of the stored germane. For example, germane stored in a storage vessel as described may experience less than 1%, or preferably less than 0.1%, or more preferably less than 0.01% decomposition, based on total initial adsorbed germane capacity, over a period of 365 days at ambient temperature.

Germane, the chemical compound having the chemical formula $GeH_4$, also known as "germanium tetrahydride" or germanomethane, is a known reagent gas used in the semiconductor industry.

According to the present description, germane is stored in a vessel that contains zeolitic imidazolate framework adsorbent, with germane being adsorbed on the zeolitic imidazolate framework adsorbent. The storage system is of a type known as an adsorbent-based storage system that includes a vessel that contains zeolitic imidazolate framework adsorbent. Zeolitic imidazolate framework adsorbents are known and are known to be compositionally different from other known types of adsorption media such as carbon-based adsorption media, polymeric adsorption media, silica, etc.

Zeolitic imidazolate frameworks are a type of metal organic framework (MOF) that is known to be useful as an adsorbent for storing certain reagent gases, including for storage and delivery of reagent gases for use in semiconductor processing. Zeolitic imidazolate frameworks are metal organic frameworks that include a tetrahedrally-coordinated transition metal such as iron (Fe), cobalt (Co), Copper (Cu), or Zinc (Zn), connected by imidazolate linkers, which may be the same or different within a particular ZIF composition or relative to a single transition metal atom of a ZIF structure. The ZIF structure includes four-coordinated transition metals linked through imidazolate units to produce extended frameworks based on tetrahedral topologies. ZIFs are said to form structural topologies that are equivalent to those found in zeolites and other inorganic microporous oxide materials.

A zeolitic imidazolate framework can be characterized by features that include: a particular transition metal (e.g., iron, cobalt, copper, or zinc) of the framework; the chemistry of the linker (e.g., chemical substituents of the imidazolate units); pore size of the ZIF; surface area of the ZIF; pore volume of the ZIF; among other physical and chemical properties. Dozens (at least 105) of unique ZIF species or structures are known, each having a different chemical structure based on the type of transition metal and the type of linker (or linkers) that make up the framework. Each topology is identified using a unique ZIF designation, e.g., ZIF-1 through ZIF-105. For a description of ZIFs, including particular chemical compositions and related properties of a large number of known ZIF species, see Phan et al., "Synthesis, Structure, and Carbon Dioxide Capture Properties of Zeolitic Imidazolate Frameworks," Accounts of Chemical Research, 2010, 43 (1), pp 58-67 (Received Apr. 6, 2009).

Pore size of a ZIF can affect the performance of a ZIF as an adsorbent. Example ZIFs can have pore sizes in a range from about 0.2 to 13 angstroms, such as from 2 to 12 angstroms or from 3 to 10 angstroms. Pore size refers to the diameter of the largest sphere that will pass through the surface of the ZIF crystal. For use as an adsorbent in a vessel of the present description, a ZIF can have any pore size that is effective to provide desired storage performance.

Useful or preferred ZIFs can be capable of providing a useful storage capacity, useful delivery capacity, and, preferably, can be used to store adsorbed germane in a storage vessel with a relatively low amount of degradation of the stored germane.

One example of a ZIF that has been found to be useful in a vessel as described, for adsorbing germane gas in a vessel and storing the germane gas in the vessel at sub-atmospheric pressure, is referred to as "ZIF-8," which is zinc dimethylimidazolate (a.k.a. "zinc(dimethylimidazolate)2." This zeolitic imidazolate framework is reported to have a pore size of 3.4 angstroms. See U.S. Pat. No. 9,138,720, describing ZIF-8 among other MOFs.

When contained in a vessel for storing germane as described herein, the zeolitic imidazolate framework can be in any useful form, such as granular (particles), monolithic, or otherwise. For various example embodiments, a preferred zeolitic imidazolate framework may be in the form of particles, which can be easily placed (e.g., poured) into a vessel such as a cylinder that includes a relatively small opening. Still, other forms of zeolitic imidazolate framework can also be useful or preferred for different product designs, including monolithic or block adsorbents, rods, or space-filling polyhedron adsorbents.

Within an exemplary vessel, at a temperature at which the vessel will be used to deliver germane, the contained germane can be in a form that includes a portion that is in a condensed or gaseous form (i.e., as gaseous germane), in equilibrium with germane that is adsorbed on the zeolitic imidazolate framework. The temperature of the vessel and germane can be within a range of temperatures to which the vessel may be exposed during use (e.g., a temperature in a range from about 0 to about 50 degrees Celsius). This range includes operating temperatures, which are typical temperatures at which the vessel will be held during controlled storage and use in an "ambient temperature" or room temperature environment, generally understood to include temperatures in a range from about 20 to about 26 degrees Celsius.

At a temperature at which the vessel will be used to deliver reagent gas, the gaseous germane can be at a sub-atmospheric pressure, i.e., at a pressure of below about 1 atmosphere (760 torr), absolute. The internal pressure of the vessel may be in this range during use, and may be highest when the vessel contains a maximum amount of germane, i.e., when the vessel is "filled" with germane. During use, as germane is gradually removed from the vessel, the internal vessel pressure will gradually be reduced and may reach a pressure that is below 700, 600, 400, 200, 100, 50, 20, 10, 5, 3, 1, or 0.5 Torr.

A vessel of a storage system as described may contain zeolitic imidazolate framework adsorbent as the only type of adsorption media present at the vessel interior, or, if desired, may contain zeolitic imidazolate framework adsorbent in combination with another type of adsorption media. In certain presently preferred embodiments, adsorption media contained in a vessel may be substantially (e.g., at least 50, 80, 90, 95, or 97 percent) or entirely zeolitic imidazolate framework adsorbent as described herein, and other types of adsorption media are not required and may be excluded from the vessel interior. In other words, the total amount of adsorbent that is contained at an interior of a vessel may comprise, consist essentially of, or consist of zeolitic imidazolate framework adsorbent, particularly including the general and specific types of zeolitic imidazolate framework adsorbents described herein.

According to the present description, a composition that consists essentially of a specified material or combination of materials is a composition that contains the specified material or materials and not more than an insignificant amount of any other material, e.g., not more than 2, 1, 0.5, 0.1, or 0.05 percent by weight of any other material. For example, a description of a vessel interior that contains adsorbent that consists essentially of zeolitic imidazolate framework adsorbent refers to a vessel having an interior that contains the zeolitic imidazolate framework adsorbent and not more than 2, 1, 0.5, 0.1, or 0.05 percent by weight of any other type of adsorption media, based on total weight adsorption media at the vessel interior.

Various examples of vessel structures for storing reagent gases can be useful for storing germane, using zeolitic imidazolate framework as adsorbent, by adaptation according to the present description. Example vessels include cylindrical containers ("cylinders") that include rigid cylindrical sidewalls that define a vessel interior and an outlet (or "port") at an end of the cylinder. The vessel sidewalls can be made of metal or another rigid, e.g., reinforced, material, and are designed to withstand a level of pressure that safely exceeds a desired maximum pressure recommended for containing reagent gas at the interior of the vessel.

FIG. 1 shows an example of a fluid supply system ("fluid supply package") as described, in which zeolitic imidazolate framework adsorbent is disposed for storage of and delivery of germane. As illustrated, fluid supply package 10 comprises vessel 12 that includes a cylindrical wall 14 and floor enclosing an interior volume 16 of vessel 12 in which is disposed zeolitic imidazolate framework adsorbent 18. Vessel 12 at its upper end portion is joined to cap 20, which may be of planar character on its outer peripheral portion, circumscribing upwardly extending boss 28 on the upper surface thereof. Cap 20 has a central threaded opening receiving a correspondingly threaded lower portion 26 of a fluid dispensing assembly.

Valve head 22 that is movable between open and closed positions by any suitable action such as manually operated hand wheel or pneumatically operated activator 30 coupled therewith. The fluid dispensing system includes an outlet port 24 for dispensing gaseous germane from the fluid supply system when the valve is opened by operation of the hand wheel 30.

The zeolitic imidazolate framework adsorbent 18 in the interior volume 16 of vessel 12 may be of any suitable type as herein disclosed, and may for example comprise adsorbent in a powder, particulate, pellet, bead, monolith, tablet, or other appropriate form. The zeolitic imidazolate framework adsorbent has sorptive affinity for the germane to allow storage of and dispensing of the germane within the vessel. Dispensing may be performed by opening valve head 22 to accommodate desorption of germane that is stored in an adsorbed form on the adsorbent, and discharge of germane from the vessel through the fluid dispensing assembly to the outlet port 24 and associated flow circuitry (not shown), wherein the pressure at the outlet port 24 causes pressure-mediated desorption and discharge of germane from the fluid supply package. For example, the dispensing assembly may be coupled to flow circuitry that is at lower pressure than pressure in the vessel for such pressure-mediated desorption and dispensing, e.g., a sub-atmospheric pressure appropriate to a downstream tool coupled to the fluid supply package by the flow circuitry. Optionally, dispensing may include opening valve head 22 in connection with heating of the adsorbent 18 to cause thermally-mediated desorption of fluid for discharge from the fluid supply package.

The fluid supply package 10 may be charged with germane for storage on the adsorbent by an initial evacuation of fluid from the interior volume 16 of vessel 12, followed by flow of germane into the vessel through outlet port 24, which thereby serves a dual function of charging as well as dispensing of fluid from the fluid supply package. Alternatively, valve head 22 may be provided with a separate fluid introduction port for charging of the vessel and the loading of the adsorbent with the introduced fluid.

Germane in the vessel may be stored at any suitable pressure condition, preferably at sub-atmospheric pressure or low sub-atmospheric pressure, thereby enhancing the safety of the fluid supply package in relation to fluid supply packages such as high pressure gas cylinders.

Examples

Figure 2:
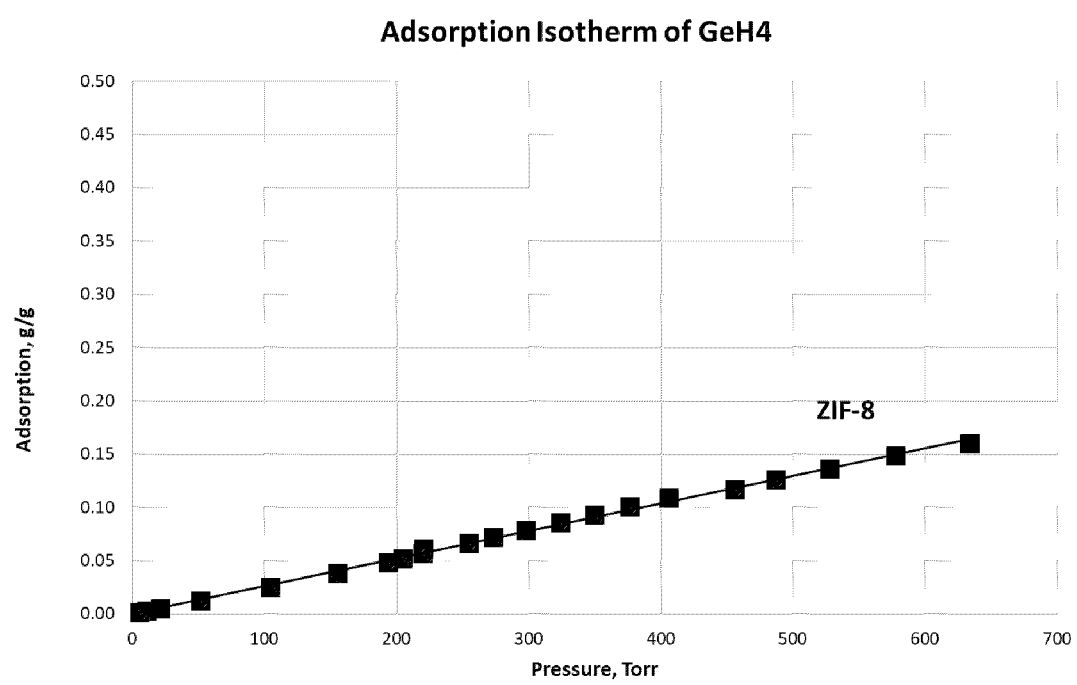
FIG. 2 shows performance data of a storage system of the present description.

FIG. 2 is a table of adsorption of germane on ZIF-8 (grams germane per gram ZIF-8) in a storage vessel as described, at sub-atmospheric pressure, relative to delivery pressure. The linear shape of the line of this data indicates that a high percentage of the germane contained in the vessel is deliverable. In addition, a linear relationship between pressure and adsorption allows easy determination of the amount of $GeH_4$ stored in a ZiF-8 filled cylinder when it is connected for use, in contrast to a more complicated relationship for a carbon filled cylinder.

Figure 3:
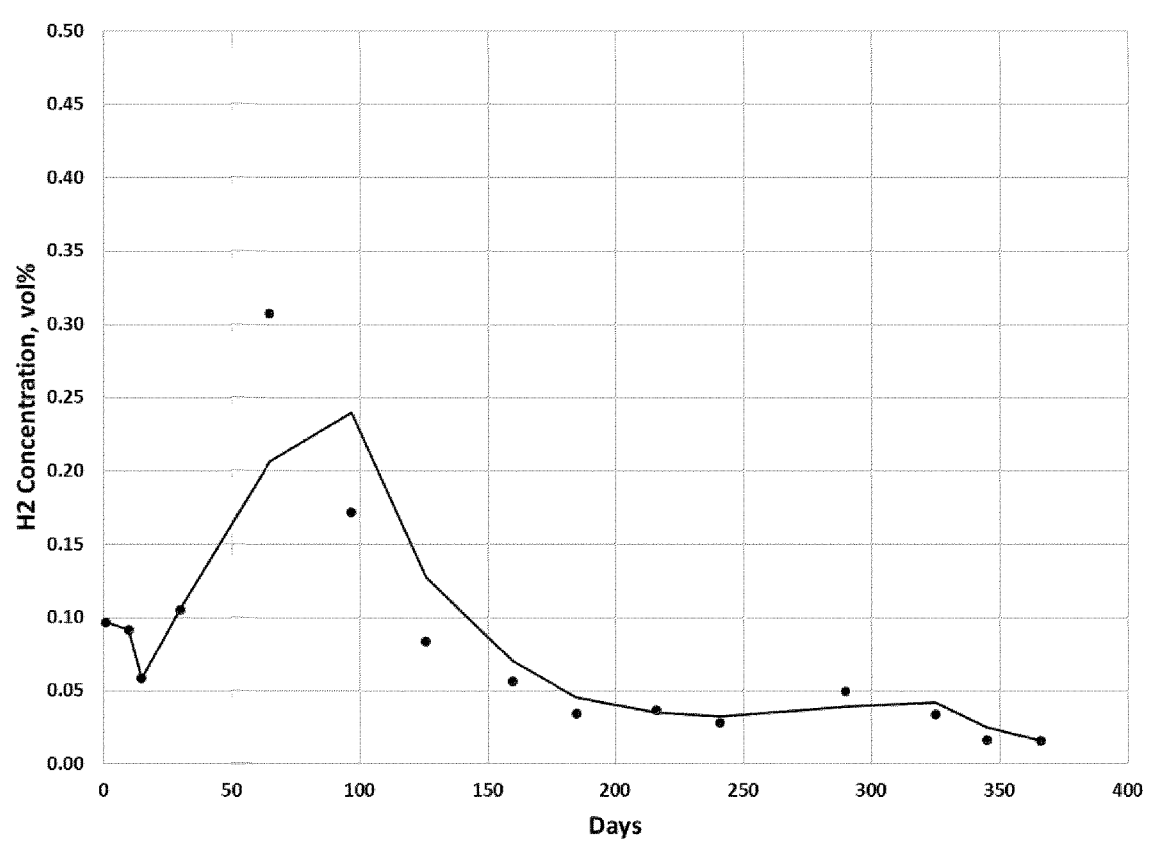
FIG. 3 shows performance data of a storage system of the present description.

FIG. 3 shows hydrogen content of germane stored on ZIF-8 over extended periods of storage.

The following table shows amounts of germane held by an amount of ZIF-8 in a storage system as described, at different pressures. Also described are amounts that may be delivered from the system, and deliverable capacity of the system.

| ZIF-8 adsorbent storage system | | |
| --- | --- | --- |
| | Grams germane per kilogram ZIF-8 | Deliverable capacity |
| full @ 550 Torr | 143 stored | |
| Heel @ 20 Torr | 5 stored | |
| Heel @ 10 Torr | 3 stored | |
| Heel @ 5 Torr | 2 stored | |
| Deliverable @ 20 Torr | 138 delivered | 96.5% |
| Deliverable @ 10 Torr | 140 delivered | 97.9% |
| Deliverable @ 5 Torr | 142 delivered | 99.3% |

For this Example, relevant features of the storage vessel, germane, and packaging and testing conditions are as follows:

The initial hydrogen content of the germane when charged to the vessel: less than 10 ppmV (particles per million by volume);

Total volume of the storage vessel: 0.5 liters;

The amount (mass) of ZIF in the storage vessel: 140 grams;

Surface area of the ZIF: 1500-1600 $m^2/g$ nitrogen BET surface area;

Shape and form of the ZIF: Extrudates, 1-3 mm in diameter, 1-5 cm long;

Temperature of the storage vessel and adsorbent for charging: $GeH_4$ was charged at 21 C in temperature controlled enclosure;

Vessel and ZIF treatment before charging: ZIF-8 was stored in a glove-box atmosphere of <10 ppm $O_2$ and <2 ppm $H_2O$ level at all times; the storage vessel was loaded with ZIF-8 in the glovebox to prevent air impurities from adsorbing on the material; the storage vessel with ZIF-8 was heated at 150 C while pumping for 24 hours to remove adsorbed air impurities including water.

At FIG. 2, Adsorption of $GeH_4$ on ZIF-8 was determined gravimetrically. The net amount of ZIF-8 was measured after loading and evacuating the test cylinder. Weight change was measured after the first charge of $GeH_4$ upon and every time after withdrawal of an amount of $GeH_4$ to reach a stable target pressure. Pressure was measured with a capacitance manometer, (MKS model 722 "Baratron").

At FIG. 3, details of the technique and equipment used to measure $H_2$ concentration of delivered samples of germane periodically over periods of days of storage:

Storage conditions (temperature): 21 C in temperature controlled enclosure.

Gas chromatography technique for measuring $H_2$ in delivered germane: gas chromatograph with thermal conductivity detector, TCD, using Gow-Mac Series 580 GC test apparatus, Hayesep porous polymer columns, and 50 C 35 $cm^3/min$ temperature and flow rate.

The invention claimed is:

1. A storage and dispensing vessel enclosing an interior volume that contains zeolitic imidazolate framework adsorbent, and $GeH_4$ adsorbed on the adsorbent, the vessel comprising:
a port;
a valve mounted at the port;
zeolitic imidazolate framework adsorbent within the interior volume; and
$GeH_4$ adsorbed on the zeolitic imidazolate framework;
the vessel being selectively actuatable to flow gaseous $GeH_4$ from the interior volume of the vessel, through the valve, for discharge of the $GeH_4$ from the vessel; and
wherein the amount of degradation of $GeH_4$ to hydrogen gas ($H_2$) is less than 1 percent of total initial adsorbed germane, over a period of 365 days, at 30 degrees Celsius; and
a storage capacity for the $GeH_4$ of at least 100 g/kg.

2. A vessel of claim 1 having an interior pressure below 760 Torr.

3. A vessel of claim 1 wherein the zeolitic imidazolate framework comprises tetrahedrally-coordinated zinc atoms connected by imidazolate linkers.

4. A vessel of claim 3 wherein the zeolitic imidazolate framework is zinc dimethylimidazolate.

5. A vessel of claim 1 containing $GeH_4$ within the interior volume at sub-atmospheric pressure, the $GeH_4$ comprising a portion that is adsorbed on the adsorbent and a portion that is present as condensed or gaseous $GeH_4$ in equilibrium with the adsorbed $GeH_4$.

6. A vessel of claim 1 capable of dispensing from the vessel at least 95 percent of the germane contained in the vessel.

7. A vessel of claim 1 capable of dispensing from the vessel at least 99 percent of the germane contained in the vessel.

8. A vessel of claim 1 capable of dispensing the germane contained in the vessel at a discharge pressure that is below 10 Torr.

9. A vessel of claim 1 wherein the amount of degradation of $GeH_4$ to hydrogen gas ($H_2$) is less than 0.1 percent of total initial adsorbed germane, over a period of 365 days, at 30 degrees Celsius.

10. A vessel of claim 1 wherein the amount of degradation of $GeH_4$ to hydrogen gas ($H_2$) is less than 0.01 percent of total initial adsorbed germane, over a period of 365 days, at 30 degrees Celsius.

11. A vessel of any of claim 1 wherein the adsorbent is in the form of granules, particulates, beads, or pellets.

12. A method of supplying $GeH_4$ from a vessel as recited at claim 1, the method comprising delivering the $GeH_4$ from the vessel interior to a vessel exterior, the $GeH_4$ being delivered from the vessel at a pressure below 760 torr.

13. A method of claim 12 wherein the $GeH_4$ is delivered at a pressure below 50 Torr.

14. A method of claim 12 wherein the $GeH_4$ is delivered at a pressure below 10 Torr.

15. A method of claim 12 comprising delivering the $GeH_4$ to a semiconductor processing device.

16. A method of claim 13 wherein the vessel contains an initial amount of $GeH_4$ charged to the interior, and the method comprises dispensing at least 95 percent of the initial amount to the semiconductor processing device.

17. A method of claim 13 wherein the vessel contains an initial amount of $GeH_4$ charged to the interior, and the method comprises dispensing at least 99 percent of the initial amount to the semiconductor processing device.

* * * * *